(12) United States Patent
Bly et al.

(10) Patent No.: US 7,269,180 B2
(45) Date of Patent: Sep. 11, 2007

(54) SYSTEM AND METHOD FOR PRIORITIZING AND QUEUING TRAFFIC

(75) Inventors: Keith Michael Bly, Newman Lake, WA (US); C. Stuart Johnson, Liberty Lake, WA (US)

(73) Assignee: World Wide Packets, Inc., Spokane Valley, WA (US)

( * ) Notice: Subject to any disclaimer, the term of this patent is extended or adjusted under 35 U.S.C. 154(b) by 1137 days.

(21) Appl. No.: 10/287,865

(22) Filed: Nov. 4, 2002

(65) Prior Publication Data

US 2004/0085978 A1 May 6, 2004

(51) Int. Cl.
*H04L 12/28* (2006.01)
(52) U.S. Cl. .................. 370/412; 370/230.1; 370/429
(58) Field of Classification Search .............. None
See application file for complete search history.

(56) References Cited

U.S. PATENT DOCUMENTS

| | | | |
|---|---|---|---|
| 5,164,938 A | 11/1992 | Jurkevich et al. | 370/231 |
| 5,483,526 A | 1/1996 | Ben-Nun et al. | 370/60.1 |
| 5,633,867 A | 5/1997 | Ben-Nun et al. | 370/399 |
| 5,748,629 A | 5/1998 | Caldara et al. | 370/389 |
| 5,758,137 A | 5/1998 | Armstrong, Jr. et al. | 713/502 |
| 5,872,769 A | 2/1999 | Caldara et al. | 370/230 |
| 5,926,459 A | 7/1999 | Lyles et al. | 370/230 |
| 5,953,318 A | 9/1999 | Nattkemper et al. | 370/236 |
| 5,999,518 A | 12/1999 | Nattkemper et al. | 370/258 |
| 6,021,132 A * | 2/2000 | Muller et al. | 370/412 |
| 6,038,217 A | 3/2000 | Lyles | 370/233 |
| 6,052,375 A | 4/2000 | Bass et al. | 370/412 |
| 6,064,650 A | 5/2000 | Kappler et al. | 370/232 |
| 6,064,651 A | 5/2000 | Rogers et al. | 370/233 |
| 6,064,677 A | 5/2000 | Kappler et al. | 370/414 |
| 6,067,298 A | 5/2000 | Shinohara | 370/395.71 |
| 6,084,856 A | 7/2000 | Simmons et al. | 370/235 |
| 6,092,076 A | 7/2000 | McDonough et al. | 707/102 |
| 6,101,420 A | 8/2000 | VanDoren et al. | 700/5 |
| 6,154,816 A | 11/2000 | Steely et al. | 711/150 |
| 6,167,054 A | 12/2000 | Simmons et al. | 370/422 |
| 6,167,445 A | 12/2000 | Gai et al. | 709/223 |
| 6,195,355 B1 | 2/2001 | Demizu | 370/397 |
| 6,205,118 B1 | 3/2001 | Rathnavelu | 370/229 |
| 6,259,699 B1 | 7/2001 | Opalka et al. | 370/398 |
| 6,343,081 B1 | 1/2002 | Blanc et al. | 370/411 |
| 6,438,134 B1 | 8/2002 | Chow et al. | 370/412 |
| 6,445,707 B1 | 9/2002 | Iuoras et al. | 370/395.43 |
| 6,477,144 B1 | 11/2002 | Morris et al. | 370/230.1 |
| 6,487,212 B1 * | 11/2002 | Erimli et al. | 370/413 |
| 6,628,652 B1 * | 9/2003 | Chrin et al. | 370/386 |
| 6,714,553 B1 | 3/2004 | Poole et al. | 370/412 |
| 6,754,206 B1 | 6/2004 | Nattkemper et al. | 370/369 |

(Continued)

*Primary Examiner*—Duc Ho
(74) *Attorney, Agent, or Firm*—Wells St. John P.S.

(57) ABSTRACT

A system is provided for prioritizing and queuing traffic from a plurality of data streams. The system includes a queuing structure, processing circuitry, and a search engine. The queuing structure has a plurality of queues. The search engine is implemented on the processing circuitry and is configured to search and edit the queues in order to manage traffic at a given instance in time by traversing each of the queues in a predetermined manner to identify and remove eligible entries from each queue that need to be transmitted. The traffic was previously classified as to type and traffic elements were previously loaded onto selected queues with other traffic elements having a similar traffic type. A method is also provided.

31 Claims, 9 Drawing Sheets

U.S. PATENT DOCUMENTS

| | | | |
|---|---|---|---|
| 6,950,400 B1 * | 9/2005 | Tran et al. | 370/236 |
| 6,980,552 B1 * | 12/2005 | Belz et al. | 370/392 |
| 7,042,841 B2 | 5/2006 | Abdelilah et al. | 370/229 |
| 7,058,789 B2 | 6/2006 | Henderson et al. | 711/220 |
| 7,072,295 B1 | 7/2006 | Benson et al. | 370/230 |
| 2001/0001608 A1 * | 5/2001 | Parruck et al. | 370/232 |
| 2001/0055303 A1 | 12/2001 | Horton et al. | 370/389 |
| 2002/0012340 A1 | 1/2002 | Kalkunte et al. | 370/360 |
| 2002/0012341 A1 | 1/2002 | Battle et al. | 370/378 |
| 2002/0071387 A1 | 6/2002 | Horiguchi et al. | 370/229 |
| 2002/0163935 A1 * | 11/2002 | Paatela et al. | 370/466 |
| 2002/0172273 A1 | 11/2002 | Baker et al. | 357/222 |
| 2002/0191622 A1 | 12/2002 | Zdan | 370/401 |
| 2003/0076848 A1 | 4/2003 | Bremler-Barr et al. | 370/412 |
| 2006/0233156 A1 * | 10/2006 | Sugai et al. | 370/351 |

* cited by examiner

| QUEUE | CREDITS |
|---|---|
| QUEUE 0 | 20 |
| QUEUE 1 | 10 |
| QUEUE 2 | 4 |
| QUEUE 3 | 2 |

FIG. 10

SYSTEM AND METHOD FOR PRIORITIZING AND QUEUING TRAFFIC

CROSS REFERENCES TO RELATED APPLICATIONS

This application claims the benefits of U.S. patent application Ser. No. 10/224,508, which was filed Aug. 19, 2002; Ser. No. 10/224,353, which was filed Aug. 19, 2002; and Ser. No. 10/231,788, which was filed Aug. 29, 2002, and all of which are incorporated by reference herein.

TECHNICAL FIELD

The present invention pertains to apparatus and methods for improving communications in digital networks. More particularly, the present invention relates to traffic queuing structures and methods used to buffer and shape traffic.

BACKGROUND OF THE INVENTION

Figure 1:
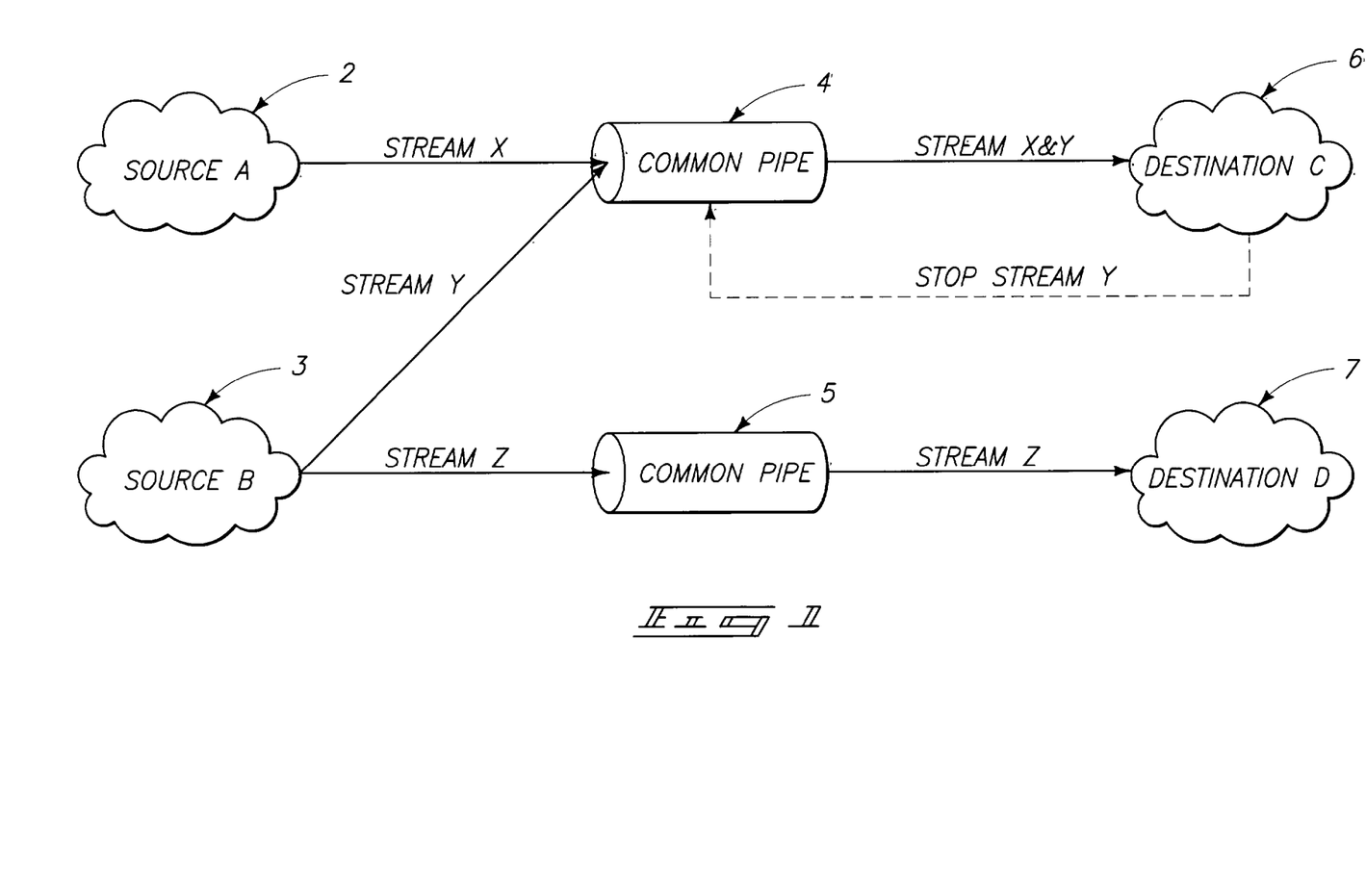
FIG. 1 is a diagrammatic illustration of a traffic management system illustrating classic head of line blocking.

Traffic management is important in digital networks. Traffic management involves the controlling and scheduling of traffic through paths established through the network. One design consideration faced by traffic management systems is the concept of head-of-line blocking, in which two or more streams of traffic are competing for the same resources. In head-of-line blocking schemes, it is a goal to protect the stream(s) of traffic that is/are in profile, and to push back on the offending stream(s). FIG. 1 illustrates a common description of this scheme. Traffic streams from Source A (reference numeral 2) and Source B (reference numeral 3) are delivered via common pipes 4 and 5 to Destination C (reference numeral 6) and Destination D (reference numeral 7). As shown, Destination C can no longer take traffic from Stream Y, and pushes the traffic back on common pipe 4 sourcing the Stream Y traffic to stop Stream Y. However, Stream X and Stream Y use the same common pipe 4 which raises a question as to how to keep from blocking Stream X when Stream Y can no longer be sent. This problem becomes even more difficult if the common pipe 4 is already full of Stream Y traffic. Hence, a solution is needed to bypass the Stream Y traffic in common pipe 4 without hindering the overall performance of common pipe 4.

Figure 2:
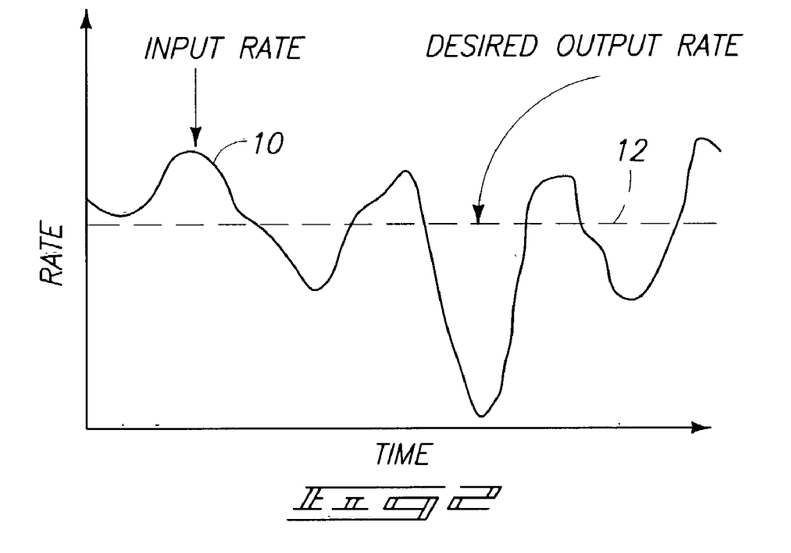
FIG. 2 is a plot of rate versus time illustrating the difference between data traffic input rate and desired output rate.

FIG. 2 illustrates another important and related concept to digital networks, traffic shaping. Traffic shaping involves buffering traffic and sending traffic based upon a desired profile. A traffic profile can include, but is not limited to the following properties: a level of priority relative to other traffic, buffer depth, latency through the buffer, jitter in sending the traffic contained in the buffer, and a rate at which the traffic should be sent. One common approach to traffic shaping involves the use of a queuing system to manage the profile. As traffic arrives, it is placed on the queue. The traffic is de-queued based upon its assigned drain rate. This is illustrated in FIG. 2. A single stream of traffic arrives at the input such that the output approaches the desired output rate 10. The desired output rate is depicted by the dotted line 12. It is highly desirable to smooth the input such that the output approaches the desired output rate 12.

Figure 3:
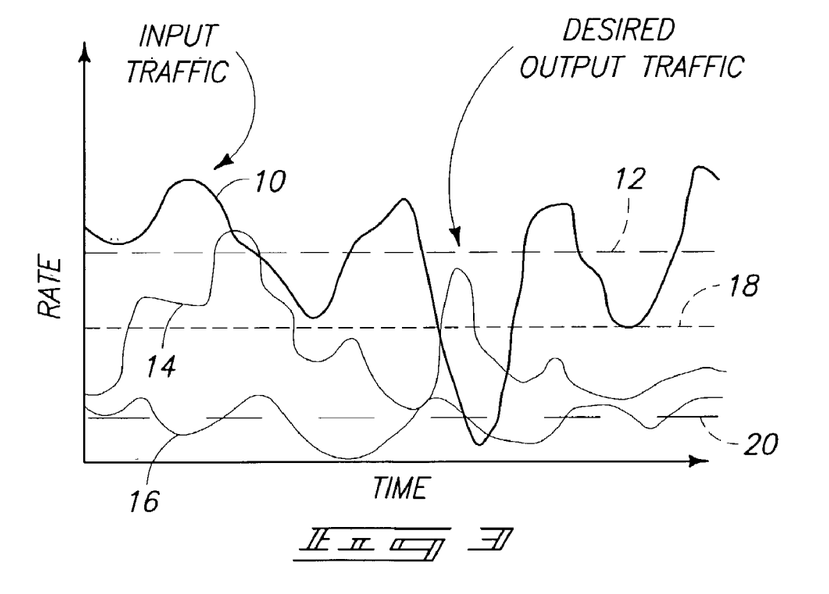
FIG. 3 is a plot of rate versus time illustrating several input streams and respective desired outputs.

To perform cost effective shaping of traffic, a traffic shaping device should be able to shape a large number of traffic profiles, as shown in FIG. 3. More particularly, FIG. 3 shows several input streams 10, 14, and 16 and desired outputs 12, 18 and 20 for those input streams. Supporting (and uniquely shaping) large numbers of traffic streams means supporting a large number of queues. However, traditional queuing structures do not scale well due to the exponential growth of instancing each queuing engine, and arbitration mechanisms that are needed to aggregate the resulting dequeued traffic to be sent. This implies that supporting a large number of queues using traditional queuing structure is inherently not cost effective.

Accordingly, a system and method are needed to avoid head-of-line blocking at line rate in order to allow for better profiling, shaping and servicing of traffic. Furthermore, improvements are needed that enable a higher utilization of ports served by a queuing structure.

SUMMARY OF THE INVENTION

A prioritizing and queuing system are provided for managing traffic in a network in a manner that avoids head-of-line blocking by providing a mechanism to bypass traffic and that does not hinder overall performance. The system provides a hardware solution for latency sensitive traffic. The solution is able to dynamically manage this bypass for a large number of streams of traffic (both active and blocked) in order to be cost effective.

According to one aspect, a system is provided for prioritizing and queuing traffic from a plurality of data streams. The system includes a queuing structure, processing circuitry, and a search engine. The queuing structure has a plurality of queues. The search engine is implemented on the processing circuitry and is configured to search and edit the queues in order to manage traffic at a given instance in time by traversing each of the queues in a predetermined manner to identify and remove eligible entries from each queue that need to be transmitted. The traffic was previously classified as to type and traffic elements were previously loaded onto selected queues with other traffic elements having a similar traffic type.

According to another aspect, a method is provided for prioritizing and queuing traffic from a plurality of data streams. The method includes: providing a queue structure including a plurality of queues; loading traffic onto a selected queue with other traffic having a similar traffic type; and traversing each of the queues in a rule designated order to identify and remove eligible entries from each queue that need to be transmitted.

According to yet another aspect, a system is provided for retrieving traffic elements from priority queues. The system includes queuing means, processing means, and searching means. The queuing means are provided for storing traffic elements in a plurality of queues. The searching means are provided for searching and editing the queues in order to manage traffic at a given instance in time by traversing each of the queues in a designated order to identify and remove eligible entries from each queue that need to be transmitted. The traffic was previously classified as to type and traffic elements or previously loaded onto selected queues with other traffic elements having a similar traffic type.

BRIEF DESCRIPTION OF THE DRAWINGS

Preferred embodiments of the invention are described below with reference to the following accompanying drawings.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

Reference will now be made to a preferred embodiment of Applicant's invention. An exemplary implementation is described below and depicted with reference to the drawings comprising a traffic prioritizing and queuing system identified by reference numeral 88 (see FIG. 12). While the invention is described by way of a preferred embodiment, it is understood that the description is not intended to limit the invention to such embodiment, but is intended to cover alternatives, equivalents, and modifications which may be broader than the embodiment, but which are included within the scope of the appended claims.

In an effort to prevent obscuring the invention at hand, only details germane to implementing the invention will be described in great detail, with presently understood peripheral details being incorporated by reference, as needed, as being presently understood in the art.

Figure 4:
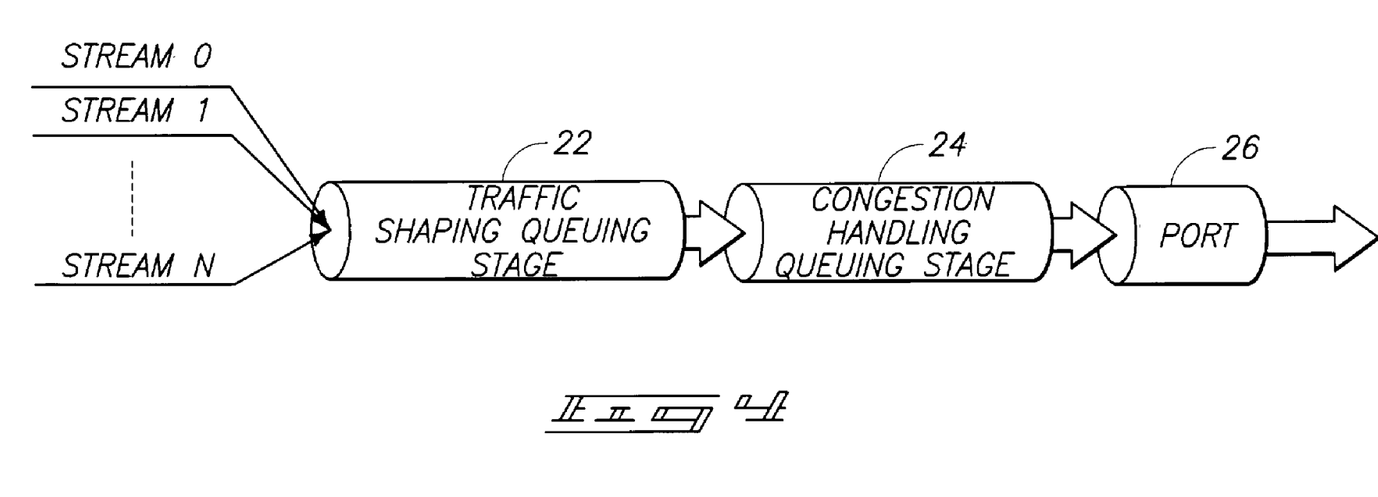
FIG. 4 is a diagrammatic illustration of a hierarchical queuing system including a traffic shaping queuing stage and a congestion handling queuing stage.

FIG. 4 shows a centralized two-level queuing structure, with a first stage (a traffic shaping queuing stage) 22 responsible for shaping of traffic, and the second stage (a congestion handling queuing stage) 24 responsible for handling instantaneous congestion from the first stage 22. Traffic that is released from the congestion handling queuing stage 24 is transferred to a port, or ports 26. Each stage 22 and 24 has its own central engine, which runs generally independently of the other. More particularly, the first stage 22 has a shaping engine 28 (see FIG. 5) and the second stage 24 has a burst management engine in the form of an add/delete search engine 30 (see FIG. 6). The traffic prioritizing and queuing system 88 of the present invention is provided within second stage 24, and is described below with reference to FIG. 12. The engines can be defined, for example, by a microprocessor, or other digital circuitry. More particularly, in one embodiment, the engines are defined by software that can be executed by a common processor or digital circuit, or by separate processors or digital circuits, though the software for the shaping engine 28 and the software for the add/delete search engine 30 run independently of each other.

Both stages 22 and 24 are linked-list based. The stage 22 includes linked lists 32 (see FIG. 5), and the stage 24 includes linked lists 34 (see FIG. 6).

Figure 5:
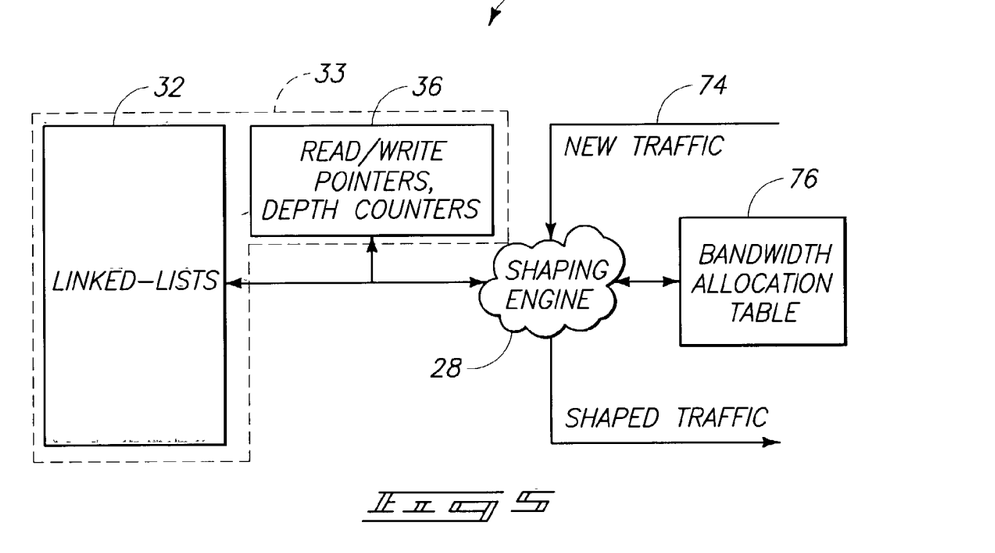
FIG. 5 is a block diagram illustrating construction details of the traffic shaping queuing stage of FIG. 4.
Figure 9:
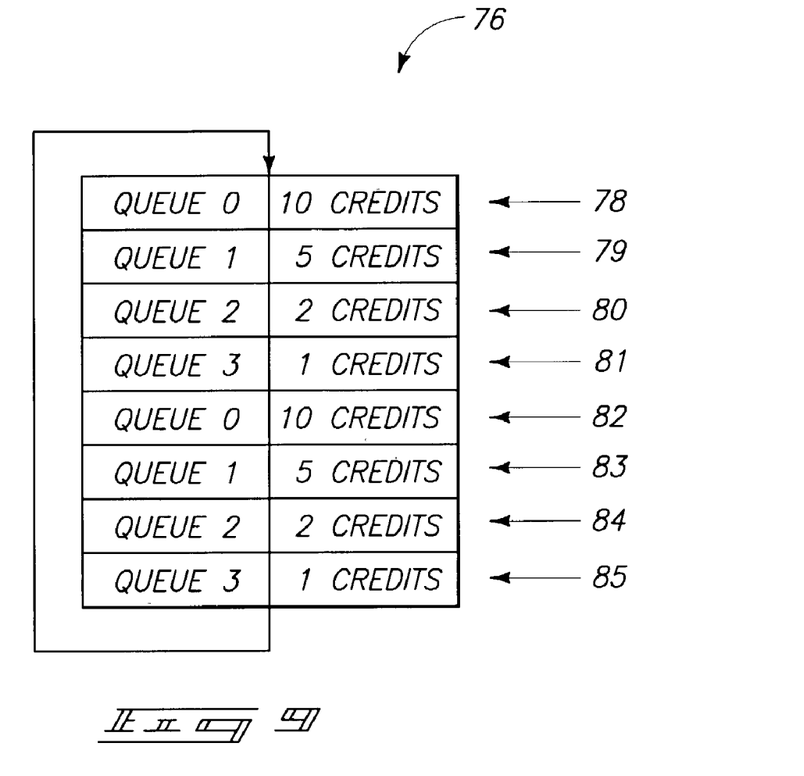
FIG. 9 illustrates a table based credit allocation scheme used in the traffic shaping queuing stage of FIG. 4.
Figure 10:
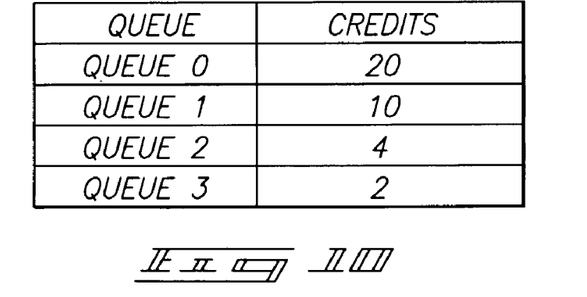
FIG. 10 illustrates credits earned after traversing the table of FIG. 9 one time.

FIG. 5 is a block diagram of the traffic shaping queuing stage 22, which includes "shaping" queues 33. Each of the shaping queues 33 of the stage 22 maintains its own set of read/write pointers and a depth counter to manage a unique linked-list within the same physical space as the other queues of the first stage 22. Two tables are used to house the shaping queues 33: one table 32 for the linked-lists, and the other table 36 to hold read/write and head/tail pointers, depth counters, etc., for the linked-lists. Other configurations are possible. The stage 22 also includes a bandwidth allocation table 76 which will be described in greater detail in connection with FIG. 9.

Figure 6:
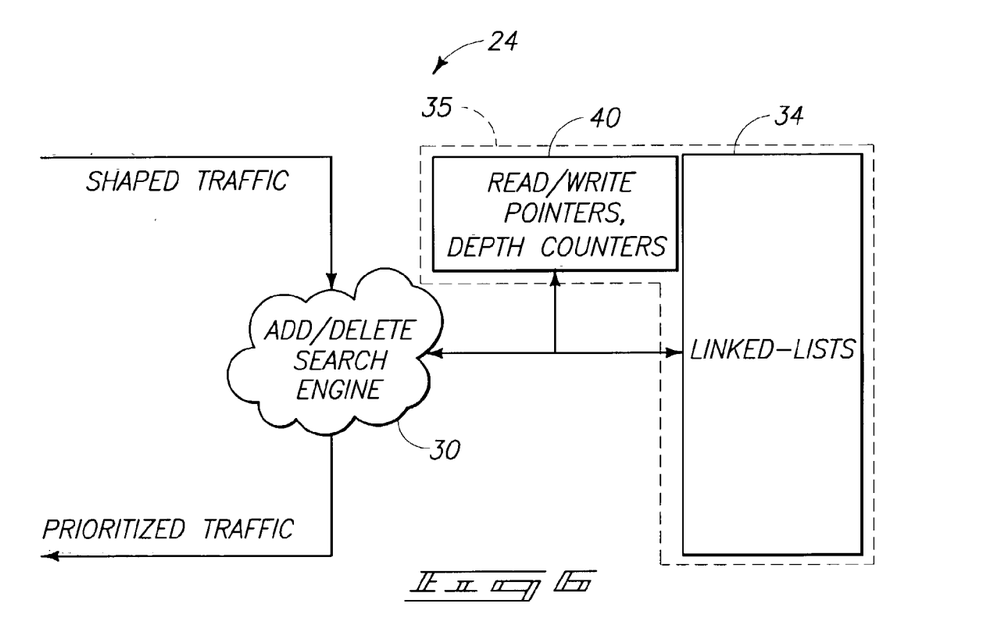
FIG. 6 is a block diagram illustrating construction details of the congestion handling queuing stage of FIG. 4.

FIG. 6 is a block diagram of the second stage 24, which includes "congestion" queues 35 to handle the instantaneous bursts from the shaping queues 33 of the first stage 22. Each congestion queue 35 of the congestion handling queuing stage 24 maintains its own set of read/write pointers and a depth counter to manage a unique linked-list within the same physical space as the other queues of the second stage 24. Two tables are used to house the profile queues 35: one table 34 for the linked-lists, and the other table 40 to hold read/write and head/tail pointers, depth counters, etc., for the linked-lists. Other configurations are possible.

The second stage 24 absorbs the potential bursts from the shaping queuing stage 22, which occur when multiple shaping queues 33 become eligible to send traffic within the same relatively small interval. This shaped traffic is then placed on the queue of the appropriate priority in stage 24.

The engine 30 drains traffic from the priority queues 35 in a starve-mode fashion, always servicing the highest priority queue that has traffic to send. The queues 35 of the second stage 24 are relatively small, as the maximum depth allowed equals the number of shaping queues 33 present in the first stage 22. This allows the first stage 22 to be an efficient buffer, in that if there is traffic on other shaping queues 33 of higher priority, it blocks the lower priority traffic, and therefore no large overhead from a traditional arbitration mechanism such as a content addressable memory. (In a connectionist system, data is stored in the activation pattern of the units—if a processing unit receives excitatory input from one of its connections, each of its other connections will either be excited or inhibited. If these connections represent the attributes of the data then the data may be recalled by any one of its attributes, not just those that are part of an indexing system. Because these connections represent the content of the data, this type of memory is called content addressable memory).

No longer must a costly engine be implemented which looks at all of the entries ready to send to pick the best one. The very nature of hierarchical queuing 33 and 35 is the self-ordering/arbitration of traffic when instantaneous congestion occurs.

Pointers and linked lists are known in the computer arts. A pointer is a variable that points to another variable by holding a memory address. A pointer does not hold a value but instead holds the address of another variable. A pointer points to the other variable by holding a copy of the other variable's address. A read/write pointer keeps track of a position within a file from which data can be read or written to. A linked list is a chain of records called nodes. Each node has at least two members, one of which points to the next item or node in the list. The first node is the head, and the last node is the tail. Pointers are used to arrange items in a linked list, as illustrated in FIG. 7.

Figure 7:
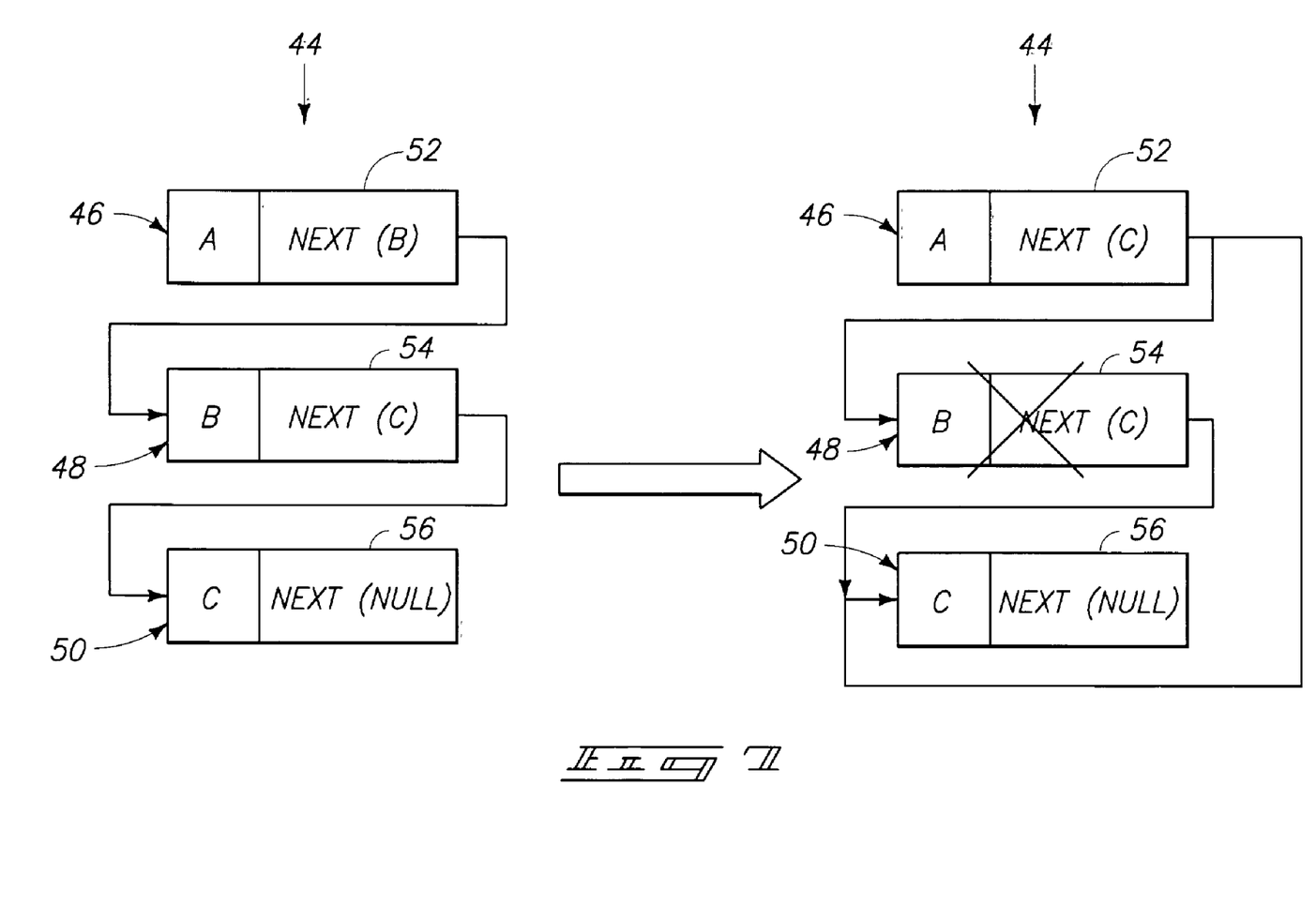
FIG. 7 is a simplified illustration of a linked list included in the traffic shaping queuing stage of FIG. 4 or the congestion handling queuing stage of FIG. 4.

FIG. 7 shows a simplified example 44 of a linked list that could be included in the linked lists 34 and illustrates linked list editing. Each entry or node 46, 48, and 50 (A, B, and C) includes a pointer 52, 54, and 56. If entry B is found to be eligible to be sent (removed from the list), where entry A was not, entry B is removed and sent (transmitted), and the link from A is repaired or edited to now point to C.

Figure 8:
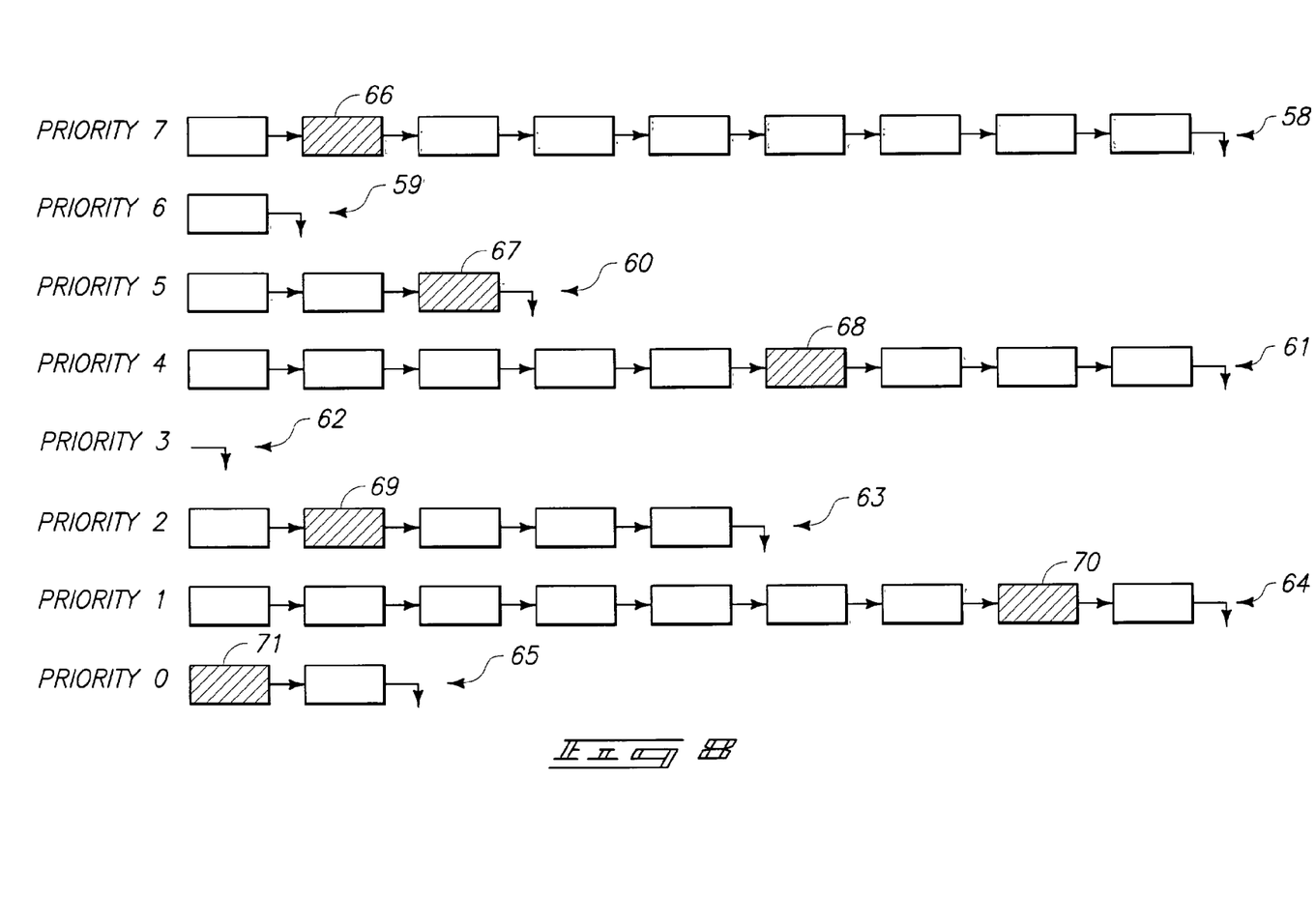
FIG. 8 illustrates a set of priority-based queues included in the congestion handling queuing stage of FIG. 4.

FIG. 8 illustrates multiple queues 58–65 defined by linked lists, and that could define, for example, the priority queues 35. FIG. 8 shows eight linked lists representing eight levels of traffic priority; other numbers of lists could be employed. The shaded entries 66–71 illustrate eligible entries that need to be sent, with the remaining entries being blocked for any of a variety of reasons. The blocked entries can be edited in a manner such as is shown in FIG. 7. The linked lists 32 are similar to those shown in FIG. 8 but are all first in, first out (FIFO); and intermediate entries cannot be sent.

The number of queues 33 and 35 in this architecture (FIGS. 4–6) is such that an infinite number of queues could be supported for either the traffic shaping queuing stage 22 or the congestion handling queuing stage 24. The number of queues 33 and 35 is only bound by size constraints of the silicon technology currently available, and the specific needs of the implementation in question.

The shaping engine 28 en-queues incoming traffic 74 (see FIG. 5) onto a selected one of the shaping queues 33 based upon look-up information, which classifies the traffic. Streaming audio or video would be classified differently than email, because streaming audio or video requires sufficient bandwidth to play without interruption. Therefore like-traffic, such as a stream or set of streams, is placed on the same one of the shaping queues 33. "Like traffic" can be defined as traffic desired for a particular application. It could be, for example, "all video traffic", or it could be "all pay-per-view" video traffic, or it could be "all traffic for customer X", or it could be all email traffic. It is a grouping of traffic with similar needs. Video, for example, requires a fast rate, with low latency and jitter influences. Email, on the other hand, can be handled on a "best efforts" basis; i.e., low-priority, without regard to latency and jitter.

This shaping queue can have a shaping profile, which includes properties such as: priority, depth, latency, jitter, and rate. For example, video needs to always get through. A large amount of latency is not desirable for video, as any latency will cause the resulting picture to become jerky, and fall behind. The same is true of the rate at which video is sent. A constant, consistent stream should be used to supply the video information "just in time" for the next entry (e.g., frame) of the picture on a TV or computer. Therefore, "video" traffic is properly classified so that it is managed appropriately. Because the video must always get through, it is given a "high" priority. Because video cannot be influenced/slowed-down with a large amount of latency, the depth of the queue is selected to be shallow. Therefore, little data can build up, waiting in the queue. With regard to rate, the video queue gets its own bandwidth end-to-end on a switch, and doesn't have to compete with any other queue for bandwidth. Queues for other classifications of traffic would similarly have appropriately chosen priorities, depths, latencies, jitter, and rates.

The rate-algorithm for the shaping queues 33 is a table based credit allocation scheme. A fixed size bandwidth allocation table 76 is traversed at a constant rate, with each location (e.g., row) 78–85 (FIG. 9) in the table identifying a shaping queue and the amount of credit to allocate to that shaping queue. Because the table is traversed at a known rate, the desired rate for one of the shaping queues 33 can be achieved by loading a specific number of entries in the table with a specific amount of credit for that shaping queue. This defines the rate at which entries can be de-queued. As long as there is enough traffic to keep the queue from being empty, this drain rate can be maintained indefinitely. The rate itself is calculated by dividing the amount of credit listed in the table 76 by the time it takes to traverse the table 76 one time. A shaping queue is considered eligible to send an entry (e.g., a packet or, more particularly, a frame) when the queue has acquired enough credit to send the entry in question.

Based upon the needs of the design in which this queuing structure is implemented, the size of the table 76 can be adjusted to provide the desired minimum and maximum achievable rates. The minimum rate is defined by one credit divided by the table traversal time, and the maximum rate is defined by the maximum number of entries allowed in the table, each containing the maximum number of credits, divided by the table traversal time. The maximum number of entries allowed in the table is dictated by the implementation. For example, the maximum number of entries allowed in the table is determined by the overall "profile" of the port(s) supported by this queuing structure, etc. More particularly, the maximum number of entries allowed in the table is determined by the circuitry or software (e.g., a state-machine) that manages traversing the table relative to the number of queues in the implementation, and how it manages updating the credit for each queue.

When the traffic shaping queuing stage 22 (of FIG. 5) is eligible to send traffic based upon its rate-algorithm, the first entry in the appropriate one of the queues 33 of the traffic shaping queuing stage 22 is sent to the second stage 24 (of FIG. 6). This, however, happens only if the shaping queue in question does not already have an entry pending in the second stage 24. Whenever an entry is sent to the second stage 24, the first stage keeps track of this by, for example, setting a "pending" flag for that specific shaping queue. The pending flag is only lowered when the second stage 24 de-queues that specific entry. At that time, the shaping queue can reevaluate its shaping status, to see if it is again eligible to send the next entry (assuming the shaping queue is not empty).

The second stage 24 is a set of priority-based queues 35. Each time an entry is sent to the second stage 24 from the first stage 22, it is accompanied by information indicating the priority of the shaping queue from which it came. This priority is used to determine on which of the priority queues 35 to place the entry. Because a queue from the traffic shaping queuing stage 22 can have only one entry at a time in the priority queues 35, the total space required for this set of priority queuing linked-lists 34 is based on the number of shaping queues in existence.

The second stage 24 uses a burst management engine in the form of an add/delete search engine 30 to traverse the priority queues 35 in a starve-mode, such that the one with the highest priority will be serviced first, sending any entries it may have prior to doing the same for lesser priority queues. This second stage 24 is advantageous because the first stage 22 may have more than one queue become eligible to send an entry at relatively the same time. In fact, all shaping queues 33 could potentially become eligible at relatively the same time. It is when this occurs that the value of the second stage 24 becomes apparent, as it buffers up all of these eligible entries, and then doles them out over time (highest priority first) based upon the throughput available for the port or ports 26 supported by the queues 35. This simplifies the searching needed, and allows for an infinite number of queues 33 and 35 to be managed, by dividing the problem into two simpler steps: earning bandwidth, followed by transmission arbitration. This eliminates the need for expensive caching and/or fairness algorithms.

According to one implementation, a starve mode servicing algorithm is used to manage the second queuing stage. However, other traditional servicing algorithms can be used as well, such as weighted round robin, and pure round robin. The choice of algorithm is dependent upon the implementation needs of the design at hand. The one implementation uses starve mode, because it provides the most useful form of priority-based precedence-ordering of traffic in a congested situation.

Figure 11:
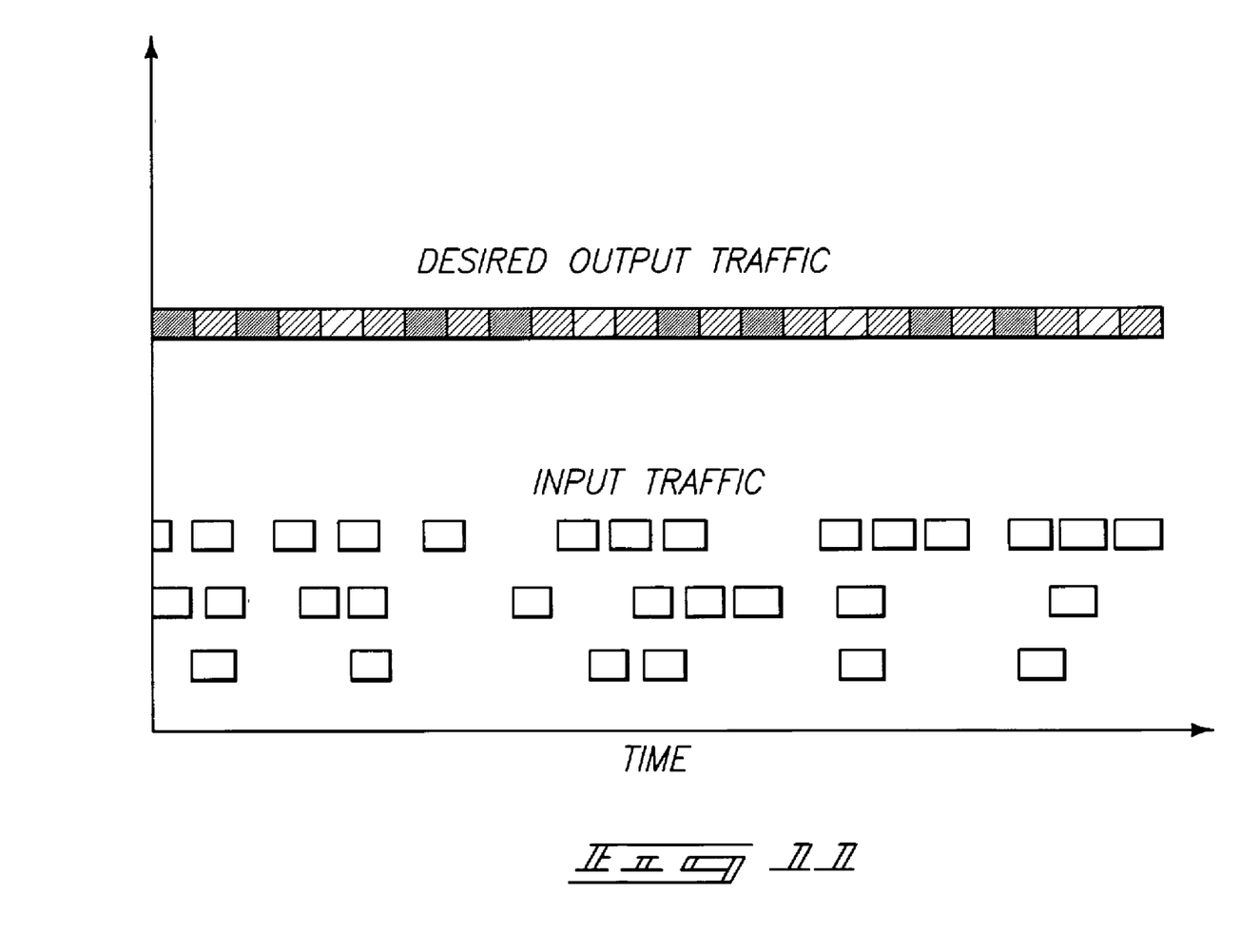
FIG. 11 illustrates how utilization of a port or pipe by multiple streams of traffic is maximized by the system of FIG. 4.

The resulting desired shaping behavior is depicted in FIG. 11, this time using packets rather than rate measurements. As shown, the utilization of the port or pipe is maximized, and the traffic smoothed to help ease congestion further on in the network.

Problems solved by this implementation feature include management of the shaping and crediting of a large number of queues by a central "shaping" engine. Another problem solved by this implementation is management in the form of arbitration between a large number of queues all vying to send traffic at the same instant in time, using a central "arbitration" mechanism. This provides a solution that is scalable, providing the ability to shape traffic for a variety of implementations in a cost effective manner; i.e., in a smaller feasible design.

This solution provides a centralized queuing structure, capable of supporting one or more ports, with a high queue density count. This centralized queuing structure is capable of dynamically supporting different ports over time, rather than a fixed set of queues only able to support a single port or ports. The design of the above-described implementation is' also scalable. The design of this implementation, by its very nature, can be implemented for one queue up to the feasible limits of today's technology, without significantly increasing the size of the central engine. The only increase to cost of increasing size is the space needed for the linked-list management. Further, the design of the implementation by its very nature can be implemented to support an infinite variety of min/max rate relationships. Previous implementations could only perform gross granularity transitions for various desired rates.

The preferred environment is all of Ethernet. Slight modification to "shaping" profiles would allow for use in any communication technology including, for example, ATM and SONET.

In one embodiment, the first and second queuing stages are defined together on a single ASIC, which provides for sufficient clock-speed to support Gigabit Ethernet rates.

Having a two-stage structure provides efficiency and performance advantages over a traditional queue-arbitration mechanism. No longer is a massive arbiter or caching engine needed to manage choosing which traffic to send from a plurality of queues when instantaneous congestion occurs across those queues.

Various alternative embodiments are possible. For example, one alternative embodiment has a reduced or increased number of shaping queues. Another alternative embodiment has a reduced or increased number of priorities. The two stage design can be implemented in a per port fashion instead of in a central queuing system.

Figure 12:
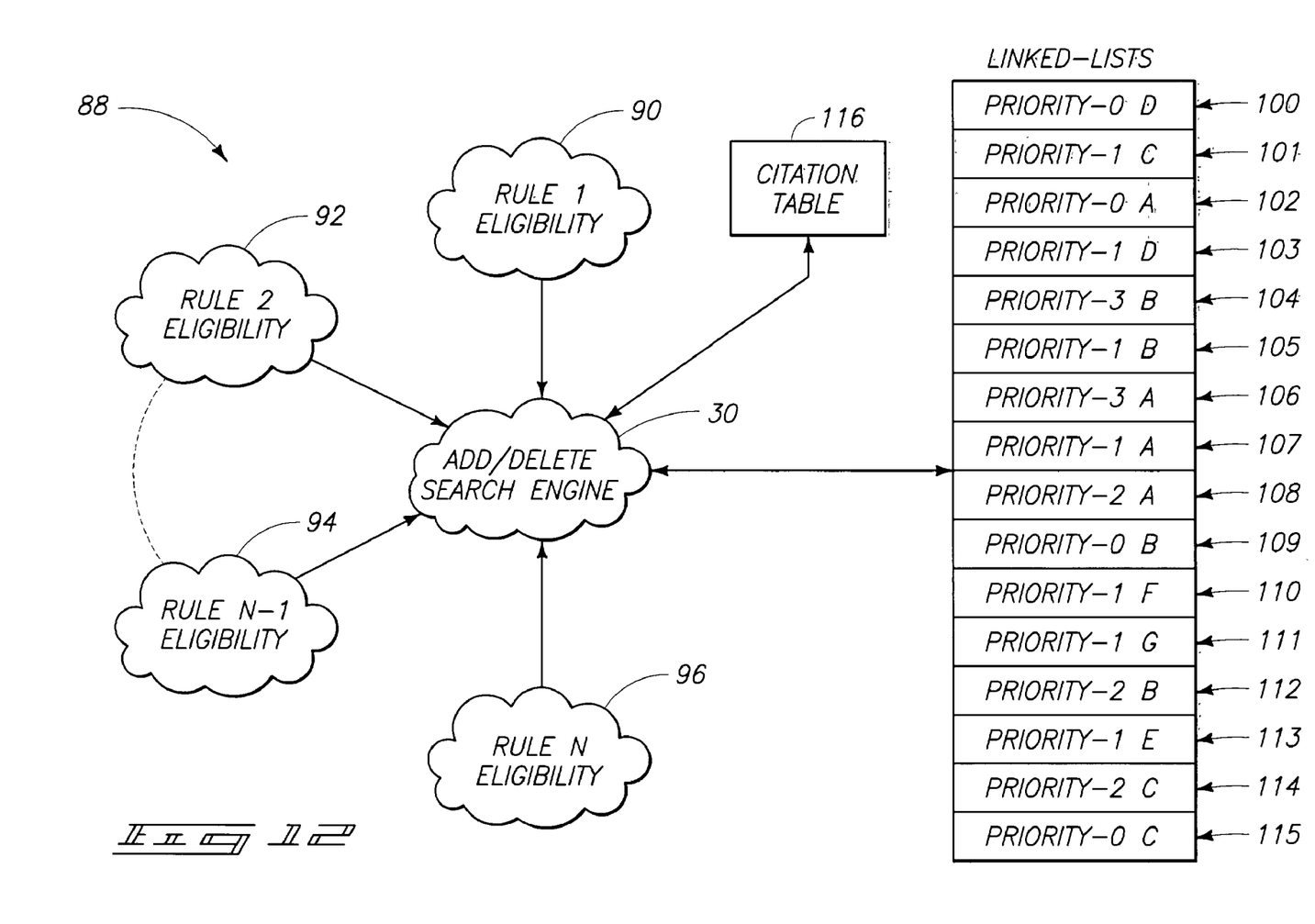
FIG. 12 illustrates a traffic prioritizing and queuing system including a rules based search engine using rules based selection of entries that give best coverage of multiple ports with the highest possible priority traffic.

FIG. 12 illustrates a final step wherein eligibility rules 90, 92, 94, and 96 are dynamically changed, while still attempting to select those entries 100–115 within linked-lists 98 which give the best coverage of multiple ports, with the highest possible priority traffic. More particularly, add/delete search engine 30 is configured in processing circuitry (such as a microprocessor) to dynamically change application of rules 90, 92, 94, and 96. It is understood that memory is also associated with the processing circuitry. More particularly, engine 30 enables rules-based selection in order to realize a more efficient transmission of traffic. By rendering this ability into hardware, functionality is delivered at a new level which allows for sustained throughput, better efficiency, and higher utilization of a network, as a whole. Engine 30 enables the ability to dynamically pressure, or allocate, one set of offending traffic by implementing a hardware-based queuing structure made up of multiple liked-lists 98, which are managed by central search engine 30.

Usage of multiple linked-lists 98 enables an increase in efficiency for search engine 30 by allowing search engine 30 to concentrate on the most pressing traffic available at that instant in time. In order to do this, the traffic is first classified by priority. Then, the traffic is loaded onto the same queue, or linked-list, with other traffic, or streams, of the same priority. Search engine 30 traverses each linked list in a starve-mode fashion, which means that search engine 30 always starts a search with the linked-list with the highest priority traffic that is not empty. The search engine searches for eligible entries throughout the entire linked-list before moving on to the next highest priority queue. This particular application is an example of backpressure, being port or destination-based, and is one of many types of backpressure (or rules) that can be applied. However, other applications of rules are possible.

More particularly, other alternative applications of rules suitable for use with search engine 30 (of FIG. 12) could be priority, source, rate, or even time-based. The placement of search engine 30 in a central location is useful, as multiple rules can be presented to engine 30, while searching the lists, thereby finding the "best fit" across all of the rules. When an eligibility entry is found, it is removed from the linked-list and sent on its way, regardless of where it is in the list.

As was previously shown in FIGS. 4 and 5, issues regarding loss of order are handled by stage 22, which precedes the present stage 24 in the overall architecture. This serves to guarantee that only one element from a given stream is in these queues at a time.

Further to the description of FIG. 7, whenever an entry is found which is not the head entry, or read pointer, the linked-list is edited by the search engine. This editing is done by extracting the eligible entry and repairing the list's link to the next entry. The entry is capable of doing this for any location in the linked-list including the head and tail locations, and for a linked-list of any length (0-N entries).

Search engine 30 (see FIG. 12) is also aware of a configurable mode per entry-type that serves to dictate whether or not to obey the blocked status from the current rules being applied. More particularly, this mode dictates whether to select entries that are partially, or entirely eligible to be sent. As a result, even more flexibility is provided in avoiding head-of-line blocking issues. For instance, for an exemplary case of multicasting, the modes could be set up such that search engine 30 picks on the most grossly offending port or ports, by intentionally ignoring traffic for the port or ports, while still sending this same traffic to other ports. Alternatively, it may be desirable to protect certain traffic and fully enforce backpressure from the port or ports in question.

The congestion handling queuing stage 24 (of FIG. 4) has a list, or suite, of rules provided in a citation table that indicates which rules are to be listened to for a particular shaping queue. In this manner, a selection is made as to which rules are listened to and the present status of such rules. For example, from a given suite of rules, the citation table can indicate that backpressure rules are to be ignored, and that priority order rules are to be ignored. In this manner, the application of specific rules can be dynamically or statically applied.

As shown in FIG. 12, a final step of the process is shown being implemented by the system 88 and search engine 30. More particularly, eligibility rules 90, 92, 94, and 96 are dynamically changed which changes what entries are available, while still attempting to select those entries 100–115 which give the best coverage of multiple ports, with the highest possible priority traffic. Here, entries 100, 102, 109 and 115 have the same priority, 0.

From FIG. 12, the advantages of rules-based selection can be readily seen. Traffic can be sent more efficiently because of the rules-based selection, and the ability to dynamically change the rules. Additional benefits are provided by rendering this ability into hardware which brings the functionality to a whole new level, allowing for sustained throughput, better efficiency, and higher utilization of the corresponding network, as a whole.

Pursuant to FIGS. 1–11, traffic is classified, placed onto a specific priority queue (after being shaped by shaping queues), and using classification knowledge is place onto a specific priority queue (after being shaped by the shaping queues). The specific priority queue is used to queue traffic elements of that specific priority. In essence, traffic is sorted and loaded onto queues based upon a known property of the traffic elements in question. The present invention deals with how elements are retrieved from the priority queues using eligibility rules.

By way of example, backpressure is received at circuitry within the traffic prioritizing and queuing system from downstream points in a network, which have communicated back to the search engine (or circuit) that they do not wish to receive a certain type of traffic until they further notify the system. The search engine then searches each priority queue, looking for traffic elements to send, which are not of the identified "type", as requested by the downstream logic. Eventually, the downstream network will notify the circuit that it is now okay to send the previously blocked "type" of traffic, at which time that type becomes eligible again, and is now considered for being sent. During the time that some "type" (or "types") of traffic were ineligible to be sent, the circuit sent other types, allowing the network to still maintain a high utilization rate, rather than blocking eligible traffic by waiting for blocked traffic sitting in front of it in the queues to become eligible.

As previously discussed, traffic types can be identified in any of a number of ways, such as by size, destination, and even priority. If identified by priority, an entire priority queue would be blocked, i.e., marked ineligible. It is understood that the present system does not reclassify any traffic elements. Instead, the system acts upon pre-existing properties of these traffic elements in order to prioritize and queue traffic elements to realize a "best-fit" traffic configuration that enables a higher utilization of the ports served by the queuing structure. In this manner, head-of-line blocking can be avoided, thereby allowing for better profiling, shaping, and servicing of traffic.

For clarification purposes, ability to act on pre-existing properties differs from classification which is entirely different and deals with original forwarding decisions. In contrast, the present system deals with a state of the network at a present moment in time that is used to select what to send next. In this case, the forwarding decision for a traffic element has already been made, and the traffic element is simply waiting to be sent.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

The invention claimed is:

1. A system for prioritizing and queuing traffic from a plurality of data streams, comprising:
    a queuing structure having a plurality of queues;
    processing circuitry; and
    a search engine implemented on the processing circuitry and configured to search and edit the queues in order to manage traffic at a given instance in time by traversing each of the queues in a predetermined manner to identify and remove eligible entries from each queue that need to be transmitted, the traffic was previously classified as to type and traffic elements were previously loaded onto selected queues with other traffic elements having same traffic type.

2. The system of claim 1 wherein each queue comprises a linked-list, and the search engine is configured to load traffic onto a selected one of the linked-lists.

3. The system of claim 1 wherein the search engine implements eligibility rules to retrieve traffic elements based on priority from the queues.

4. The system of claim 3 wherein the search engine implements traffic prioritization rules.

5. The system of claim 4 wherein the traffic prioritization rules comprise backpressure.

6. The system of claim 4 wherein the traffic prioritization rules include priority rules that implement priority order scheduling of traffic elements.

7. The system of claim 1 wherein the search engine implements eligibility rules to retrieve traffic elements based on round-robin scheduling from the queues.

8. The system of claim 1 wherein the search engine implements eligibility rules to retrieve traffic elements based on weighted round-robin scheduling from the queues.

9. The system of claim 1 wherein the queuing structure comprises a hardware-based queuing structure.

10. The system of claim 1 wherein the search engine searches the plurality of queues in a starve-mode fashion from a queue having highest priority traffic to a queue having lowest priority traffic.

11. The system of claim 1 further comprising memory, wherein the queuing structure is implemented in the memory.

12. The system of claim 1 wherein the search engine traverses each of the queues in a priority order from most pressing traffic to least pressing traffic.

13. The system of claim 1 wherein the search engine traverses the queues in a priority order to identify most pressing traffic available at that instant in time.

14. The system of claim 1 wherein the search engine applies backpressure to retrieve traffic elements from the priority queues.

15. The system of claim 1 wherein the search engine applies priority rules to retrieve previously classified traffic by priority from the queues.

16. The system of claim 1 wherein the search engine applies source rules to classify traffic by priority.

17. The system of claim 1 wherein the search engine applies rate rules to classify traffic by priority.

18. The system of claim 1 wherein the search engine applies time-based rules to classify traffic by priority.

19. The system of claim 1 wherein the search engine applies a plurality of rules to determine eligibility of traffic elements by priority and calculates a "best fit" across all of the rules to retrieve traffic elements from the queues based on the priority from the rules.

20. A method for prioritizing and queuing traffic from a plurality of data streams, comprising:
providing a queue structure including a plurality of queues, each queue comprising a linked-list;
loading traffic onto a selected linked-list with other traffic having same traffic type; and
traversing each of the linked-lists in a priority order to identify and remove eligible entries from each linked-list that need to be transmitted.

21. The method for prioritizing and queuing traffic in accordance with claim 20 further comprising applying at least one eligibility rule to retrieve traffic elements from the queues.

22. The method of prioritizing and queuing traffic in accordance with claim 21 further comprising editing linked-lists at line rate.

23. The method for prioritizing and queuing traffic in accordance with claim 20 further comprising applying a first eligibility rule and a second eligibility rule to retrieve traffic from the queues based on eligibility.

24. The method for prioritizing and queuing traffic in accordance with claim 23 further comprising calculating a "best fit" for traffic to be retrieved using at least one of the first eligibility rule and the second eligibility rule.

25. The method for prioritizing and queuing traffic in accordance with claim 24 further comprising transmitting the "best fit" traffic onto ports served by the queue structure.

26. The method for prioritizing and queuing traffic in accordance with claim 20 further comprising editing one of the linked-lists by extracting an eligible entry from the linked-list and repairing a link in the linked-list to a next entry in the linked-list.

27. The method for prioritizing and queuing traffic in accordance with claim 20 wherein traversing each of the queues comprises searching multiple linked-lists at line rate.

28. A system for retrieving traffic elements from priority queues, comprising:
queuing means for storing traffic elements in a plurality of queues;
processing means; and
searching means for searching and editing the queues in order to manage traffic at a given instance in time by traversing each of the queues in a designated order to identify and remove eligible entries from each queue that need to be transmitted, the traffic was previously classified as to type and traffic elements were previously loaded onto selected queues with other traffic elements having same traffic type.

29. The system of claim 28 wherein the searching means is configured to implement traffic eligibility rules to retrieve traffic elements from the queues.

30. The system of claim 29 wherein the eligibility rules retrieve traffic elements based on a priority order for the traffic elements.

31. The system of claim 30 wherein the traffic eligibility rules implement destination-based back pressure.

* * * * *